UNITED STATES PATENT OFFICE.

JOHN F. GALLAGHER, OF CHICAGO, ILLINOIS.

POULTRY-GRIT.

1,399,206.      Specification of Letters Patent.      Patented Dec. 6, 1921.

No Drawing.      Application filed September 29, 1919. Serial No. 327,271.

*To all whom it may concern:*

Be it known that I, JOHN F. GALLAGHER, a citizen of the United States, residing at the city of Chicago, in the county of Cook and State of Illinois, have invented certain new and useful Improvements in Poultry-Grit, of which the following is a specification.

My invention relates to the rearing of birds and fowls which are provided with a series of digestive sacks. These include the crop in which the food is macerated, the proventriculus in which the food is further macerated and also partly digested by the acid digestive fluids, and the gizzard in which the remaining undigested food is ground by the aid of small pebbles, gravel, or other hard substances, when acted upon by the muscular contractions of the gizzard walls.

When fowls are permitted to range they ordinarily are able to provide themselves not only with gravel for their craws but also, through the medium of the diverse foods which they pick up, with a number of mineral substances which are useful and necessary to their physical welfare and to their functioning as egg and meat producers. But when confined in poultry houses or where little or no ground can be provided for ranging, the natural supply of such materials is cut off and must be replaced by artificial means.

Among the mineral substances which they require, and which they normally provide themselves with, are lime which is necessary for the growth of bone and the production of egg shells; sulfur which is a constituent of the plumage and of the albumen of the eggs and flesh, and iron a constituent of the blood. The foregoing substances or some of them may be associated in varying degrees with the sand or gravel and earthy matters of a particular locality. In addition to these manganese is of value and particularly in connection with iron and magnesia, is found to have a beneficial action on the digestive apparatus.

One object of my invention is to provide a grit which shall take the place of such pebbles and gravel with which fowls naturally supply themselves and which shall have the combined properties of hardness and sharpness enabling it to act thoroughly and effectively on food in the gizzard which remains undigested from the action thereon in the preceding digestive sacks. It is a further object of my invention to provide those mineral substances which are necessary for healthy functioning of the bird, and which, in connection with the grit material, are in such condition that they will be readily dissolved in the acid fluids of the digestive tract and in such form as to be readily assimilated. And I have found that the improved grit of the character described is of great value in the rearing and keeping of all feathered fowls, including not only the ordinary domestic poultry, but pigeons and song birds.

I have discovered that the mineral substances mentioned may be found in the slag of iron furnaces, and that by pulverizing and grading such slag a poultry grit may be obtained which has all the necessary and desirable properties above set forth. This material is quite porous and, when mingled with food in the digestive tract of the fowl, it is readily acted upon by the gastric juices and particularly by the hydrochloric acid therein. The soluble portions are thus given off to be assimilated and applied to their physiological uses, while the non-soluble portions consisting mostly of silica or combinations thereof are left to perform their function as grinding material for the food thus far undigested in the gizzard of the fowl. The residual silicious portions make a hard and sharp grinding material and are very effective for the purpose.

The slag of iron furnaces varies in a very considerable degree as to the relative proportion of its constituent elements, a slag which is well fitted for the purposes of my invention shows substantially the following analysis.

| Chemical form. | Symbol. | Percentage. |
|---|---|---|
| Silica | $SiO_2$ | 30 –35 |
| Iron oxid | $Fe_2O_3$ | 0.2– 1.2 |
| Alumina | $Al_2O_3$ | 10 –14 |
| Lime | $CaO$ | 46 –49 |
| Magnesia | $MgO$ | 0.5– 3.5 |
| Sulfur oxid | $SO_2$ | 0.2– 0.6 |

But other slags of highly varying proportions may also be used in putting my discovery into effect. The insoluble portion in all cases is available for grinding material and those portions which are soluble in the acid gastric juices will be assimilated by the fowl in proportions which are best adapted to its physiological needs. And I do not limit myself to any particular or definite composition of material nor do I limit myself to a slag which is an iron mill product. The mineral substances necessary to produce my improved grit may be mixed in the proportions desired and fused together. But under whatever conditions the fusion takes place, the granular form can best be attained through the action of water by which hardening of the fused material in masses is prevented. Preferably, it may be turned into suitable tanks supplied with water and, upon cooling under such conditions, the material will be left in granular form. Upon being dried and graded into a series of suitable or appropriate sizes, it will be in condition for use.

I claim:—

1. A poultry grit of granulated porous furnace slag comprising a constituent assimilable portion soluble in the digestive fluids of a fowl, and a non-assimilable gritty silicious portion substantially insoluble in said fluids.

2. A poultry grit of granulated porous furnace slag comprising an assimilable constituent mineral portion assimilable when dissolved in the digestive fluids of a fowl, and a constituent non-assimilable silicious portion insoluble in such fluids.

3. A poultry grit comprising ground furnace slag, said slag comprising an assimilable portion of lime, iron and sulfur and non-assimilable portion of gritty silicious material.

4. A poultry grit comprising the combination of an assimilable constituent portion including lime, sulfur and iron in combinations soluble in the digestive fluids of a fowl, and a constituent silicious portion substantially insoluble in such fluids.

In witness whereof I have hereunto set my hand at Chicago, Cook county, Illinois, this 26th day of September 1919.

JOHN F. GALLAGHER.